United States Patent [19]

Kowalski et al.

[11] Patent Number: 4,652,737
[45] Date of Patent: Mar. 24, 1987

[54] SAMPLED OPTICAL FOCUS ERROR DETECTING SYSTEM FOR ROTATING OPTICAL MEDIA

[75] Inventors: Daniel C. Kowalski, Portola Valley; Dan S. Bloomberg, Palo Alto, both of Calif.

[73] Assignee: Xerox Corporation, Stamford, Conn.

[21] Appl. No.: 614,492

[22] Filed: May 29, 1984

[51] Int. Cl.$^4$ ............................................. G01J 1/20
[52] U.S. Cl. ................................ 250/201; 250/204; 369/45
[58] Field of Search .............. 250/201 DF, 201 AF, 250/204; 369/44, 45, 46

[56] References Cited

U.S. PATENT DOCUMENTS

| | | | |
|---|---|---|---|
| 4,368,526 | 1/1983 | Harigae et al. | 250/201 |
| 4,390,781 | 6/1983 | Musha | 250/204 |
| 4,460,989 | 7/1984 | Russell | 250/201 DF |
| 4,501,493 | 2/1985 | Kubota | 250/201 DF |

Primary Examiner—Edward P. Westin
Assistant Examiner—S. Allen
Attorney, Agent, or Firm—Leonard Zalman

[57] ABSTRACT

In a focus correction servo loop which maintains optical focus on an optical disk by movement of an objective lens, a focus error signal generating system which utilizes a pair of photodetectors in a differential channel, the first detector being located a predetermined distance within the focal length of the detector lens associated with that detector and the second detector being located beyond the focal length of the detector lens associated with that detector by the same predetermined distance. When the disk is at the focal point of the objective lens, equal light will fall on both detectors. When the disk position deviates from the focal point of the objective lens, more light will fall on one detector than on the other detector. The dc value of the difference between the detector signals is the focus error signal utilized by the servo loop.

1 Claim, 9 Drawing Figures

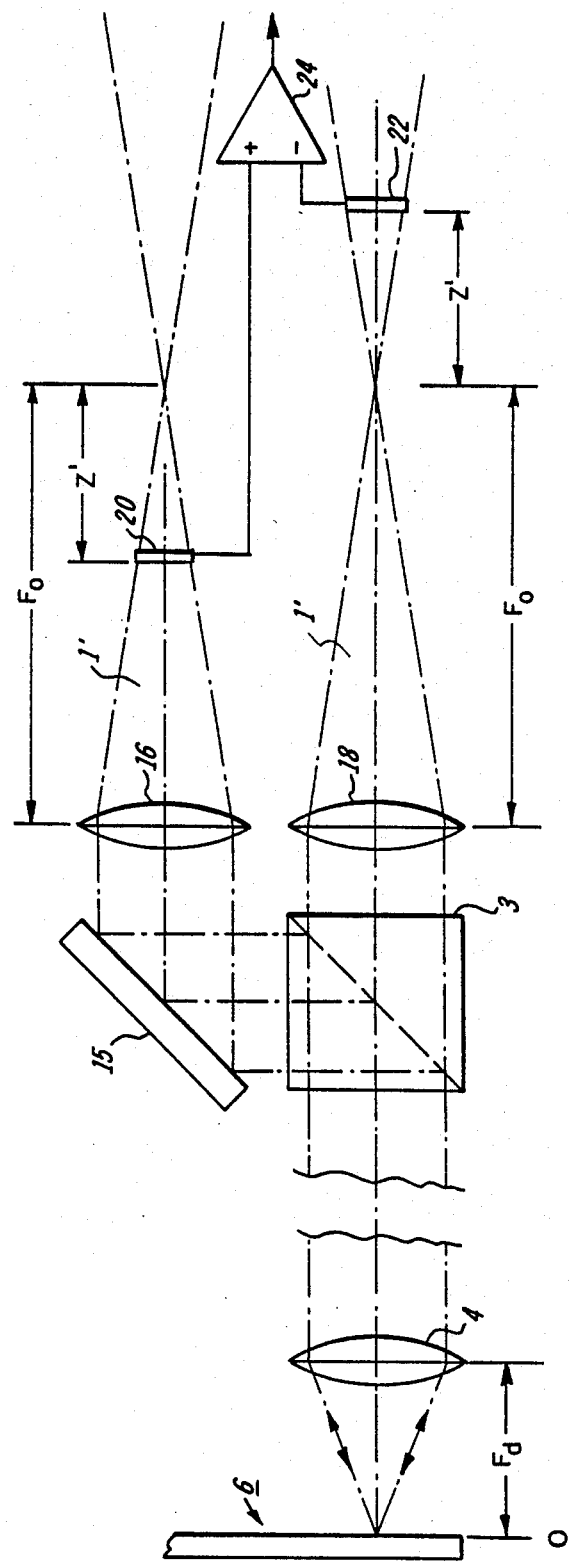
FIG. 3A  CORRECT FOCUS

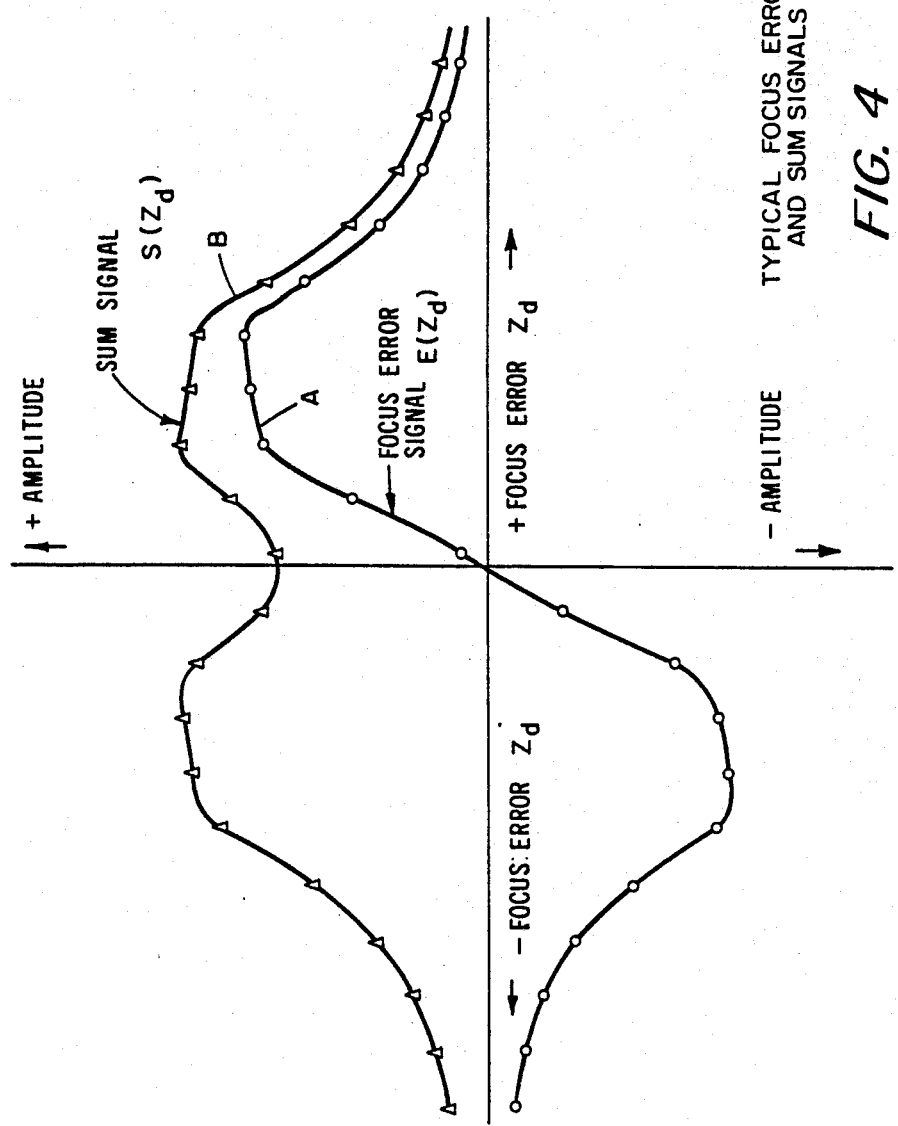

SAMPLED OPTICAL FOCUS ERROR DETECTING SYSTEM FOR ROTATING OPTICAL MEDIA

BACKGROUND OF THE INVENTION

In the optics module of conventional optical disc systems, whether erasable or non-erasable, three functions are performed, namely: (1) focus error detection and correction, (2) data tracking error detection and correction, and (3) data detection. The order of importance of these functions is the same as the order of the latter listing—the system must first achieve focus control, by movement of the objective lens, if required, then acquired data tracking, and finally write and read the recorded data.

One type of conventional focus error detection and correction system for optical disk systems utilizes an astigmatic lens placed in the path of a portion of the beam reflected from the optical disk. If the separation of the astigmatic lens and the objective lens is approximately equal to the sum of their focal lengths, the beam profile or shape produced by the astigmatic lens will vary approximately linearly with displacement of the objective lens from the optical disk. Detection of the varying beam profile can be performed by using a quadrature detector located in the path of the astigmatic beam at the point where a circular pattern is formed when the beam is in focus, the quadrature detector being oriented so that the lines dividing the quadrants A, B, C, D are at 45° with respect to the orientation of the astigmatic focus lines. The focus error signal is derived by taking the difference between the sum of the signals from detectors A and C and detectors B and D. When the disk moves out of focus, the resulting beam profile on the quadrature detector will be an ellipse with either a larger vertical than horizontal axis or the reverse. Therefore, when the disk is at the focus of the objective lens, the focus error signal is zero, when the disk is too close to, or too far from, the objective lens, the focus error signal is positive or negative.

When using astigmatic focus, proper shape of the focus error signal depends on various design factors such as the amount of lens astigmatism, the separation of the objective and astigmatic lenses, and the size of the quadrature detector. Also, there are often perterbations of the focus error signal produced, for example, by detector misalignment or the misalignment of the centroid of the astigmatic pattern on the quadrature detector, which effect the reliability of astigmatic focus.

When using ablative or thermal deformation storage, data detection and astigmatic focus can be achieved by the same quadrature detector, some outputs of the detector being compared to provide the focus error signal and all outputs of the detector being summed to derive the data signal. However, such a system has reduced sensitivity. When using magneto-optic storage, it has heretofore been considered necessary to have separate data detection and focus error detection channels. Accordingly, there is a need for a focus error signal generating technique that is more reliable and sensitive, and less component rich, than astigmatic focus, and which, when used with magneto-optic storage, can utilize the main data detection channel, with only slight modification, to also generate the focus error signal.

SUMMARY OF THE INVENTION

In a focus correction servo loop which maintains optical focus on an optical disk by movement of an objective lens, a focus error signal generating system which utilizes a pair of photodetectors in a differential channel, the first detector being located a predetermined distance within the focal length of the detector lens associated with that detector and the second detector being located beyond the focal length of the detector lens associated with that detector by the same predetermined distance. When the disk is at the focal point of the objective lens, equal light will fall on both detectors. When the disk position deviates from the focal point of the objective lens, more light will fall on one detector than on the other detector. The dc value of the difference between the detector signals is the focus error signal utilized by the servo loop.

BRIEF DESCRIPTION OF THE DRAWINGS

FIGS. 4, 5 and 7 show curves for summed data signals and summed focus error signals.

DETAILED DESCRIPTION OF THE INVENTION

Figure 1:
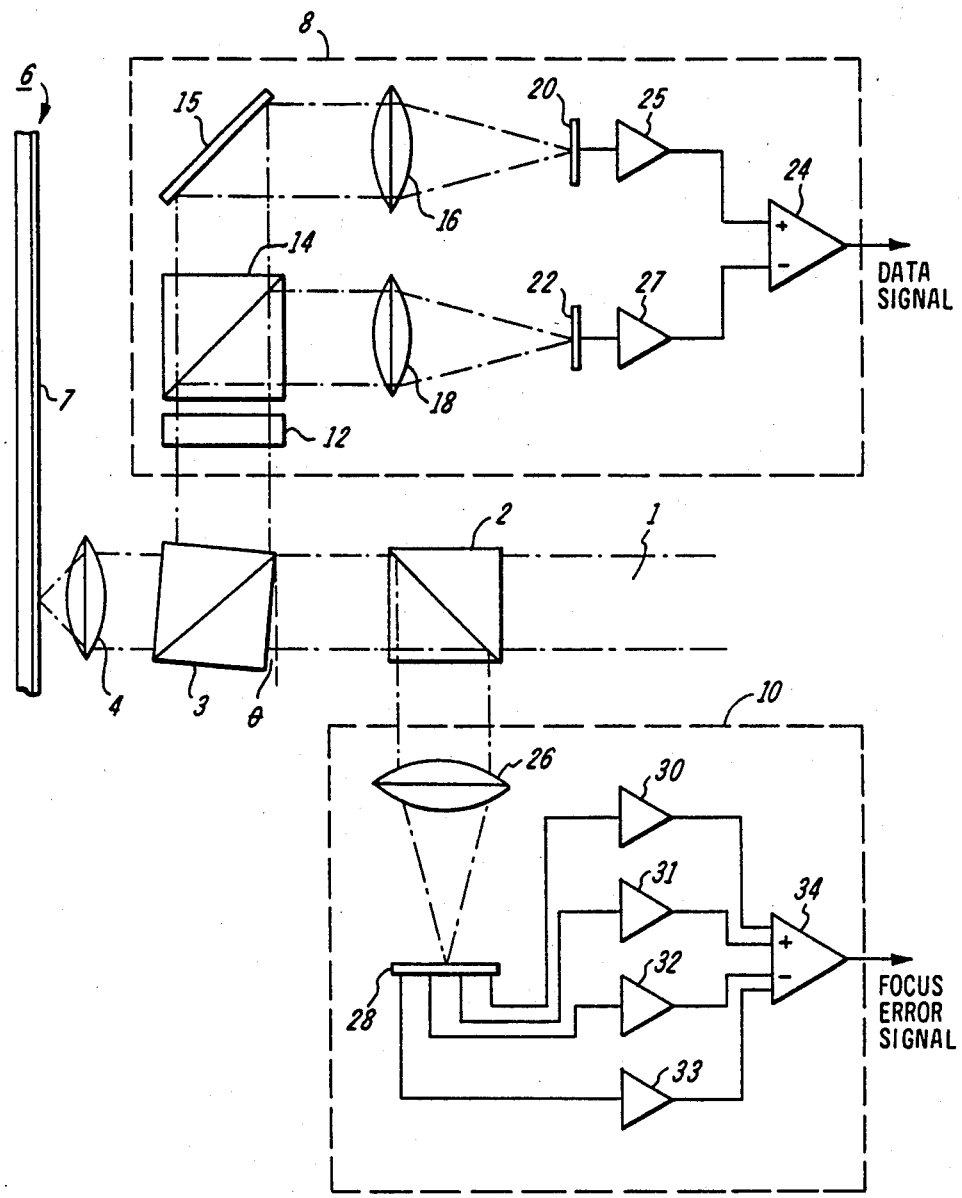
FIG. 1 is a schematic diagram of a data detection/focus error detection system of the prior art.

Referring first to prior art FIG. 1, there is shown the components of a magneto-optic module having a separate focus channel using astigmatic focus error detection as taught by the prior art. An expanded, collimated laser beam 1 is passed through appropriate polarizing components, specifically polarizing beam splitters 2 and 3, and focused by a large numerical aperture objective lens 4 onto a conventional magneto-optic disk 6 composed, for example, of a substrate supporting a magneto-optic medium 7, such as amorphous terbium iron. A portion of the light reflected by the disk is guided by the beam splitter 3 to a data detection arrangement 8 and another portion of the reflected light is guided by the beam splitter 2 to an astigmatic focus error detection arrangement 10. Data detection arrangement 8 includes a phase plate 12, a polarizing beam splitter 14, a turning mirror 15, a pair of positive detector lenses 16 and 18 with associated circular photodetectors 20 and 22, respectively, and a differential amplifier 24 receiving inputs from the photodetector pair via amplifiers 25 and 27. See an article by Connell et al, entitled "Signal-to-noise ratio for magneto-optic readout from quadrilayer structures", Appl. Phys, Lett. 42(8), 15 April 1983, pages 742–744, for a discussion of the operation of this conventional data detection arrangement 8. Due to the magnetization state of the medium 7, the light reflected from the medium has both p and s components because of the polar Kerr effect in the medium, the p and s components referring to light vibrating parallel and perpendicular to the plane of light incidence, respectively. The phase of the s component contains the information about the magnetization direction of the magnetic domains of the medium which represent the encoded information. The phase of the s component, for example, up or down, can be measured by referencing it to the phase of the p component. As taught by the referenced Connell et al article, the beam splitter 3 is rotated about the vertical axis by an angle $\theta$ such that a small fraction of the p component (and a large fraction of the s component) is permitted to leak into the data detection arrangement 8, with the p component providing the needed reference for measuring the phase of the s component.

The astigmatic focus error detection arrangement 10 includes an astigmatic lens 26 which focuses light onto a quadrature detector 28, having detectors A, B, C, D located at the point where a circular pattern is formed when the beam 1 is in focus at the medium 7. The quadrant error signals are amplified by respective amplifiers 30-33 and the differential amplifier 34 provides the focus error signal by taking the difference between the sum of the signals from detectors A and C and detectors B and D. With the described astigmatic focus, focus errors can easily occur, as previously described, and focus detection with good sensitivity requires a separate focus detection arrangement.

Figure 2:
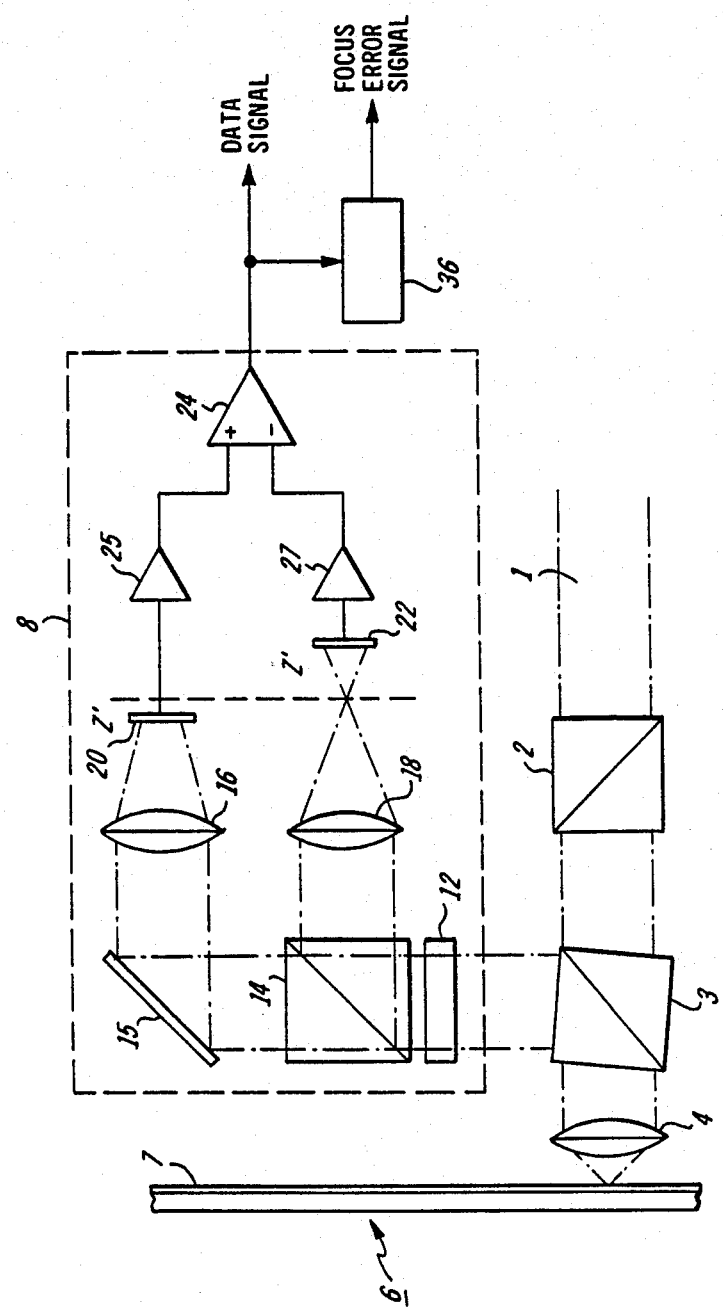
FIG. 2 is a schematic diagram of a focus error detection system in accordance with the invention.

Referring now to FIG. 2, there is shown a focus error detection arrangement (push-pull focus) which is particularly well adapted for magneto-optic storage, and, accordingly, is described in detail in relation to magneto-optic storage. The novel focus arrangement does away with the separate focus error detection arrangement 10 of FIG. 1, instead utilizing only the components of the data detection arrangement 8 of FIG. 1, with addition of only a low pass filter 36 coupled to the output of the data detection arrangement 8, to achieve focus error detection. Note that in FIG. 2 the pair of detectors 20 and 22 are moved from their position shown in FIG. 1, detector 20 being located within the focus of lens 16 by a predetermined distance $Z'$ (derived in a manner set forth supra) and detector 22 being located beyond the focus of lens 18 by the same predetermined distance $Z'$.

Figure 3B:
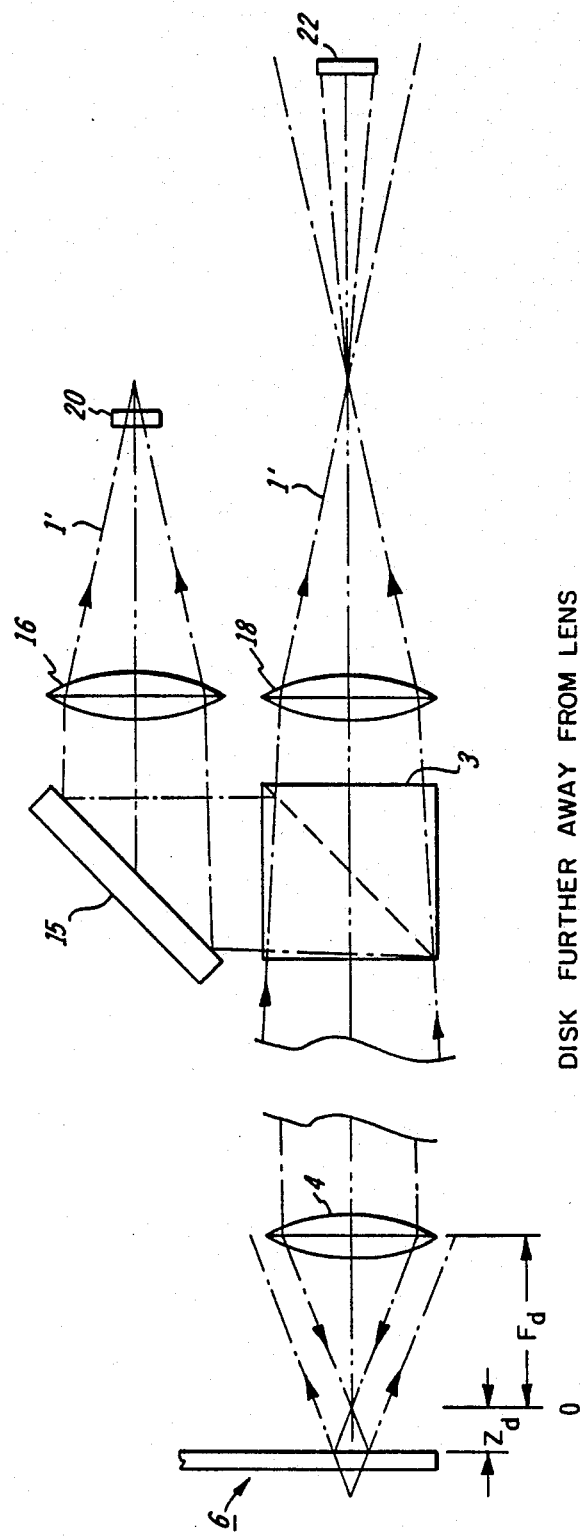
FIGS. 3a, b and c show a portion of the system of FIG. 2 for various conditions of beam focus.
Figure 3C:
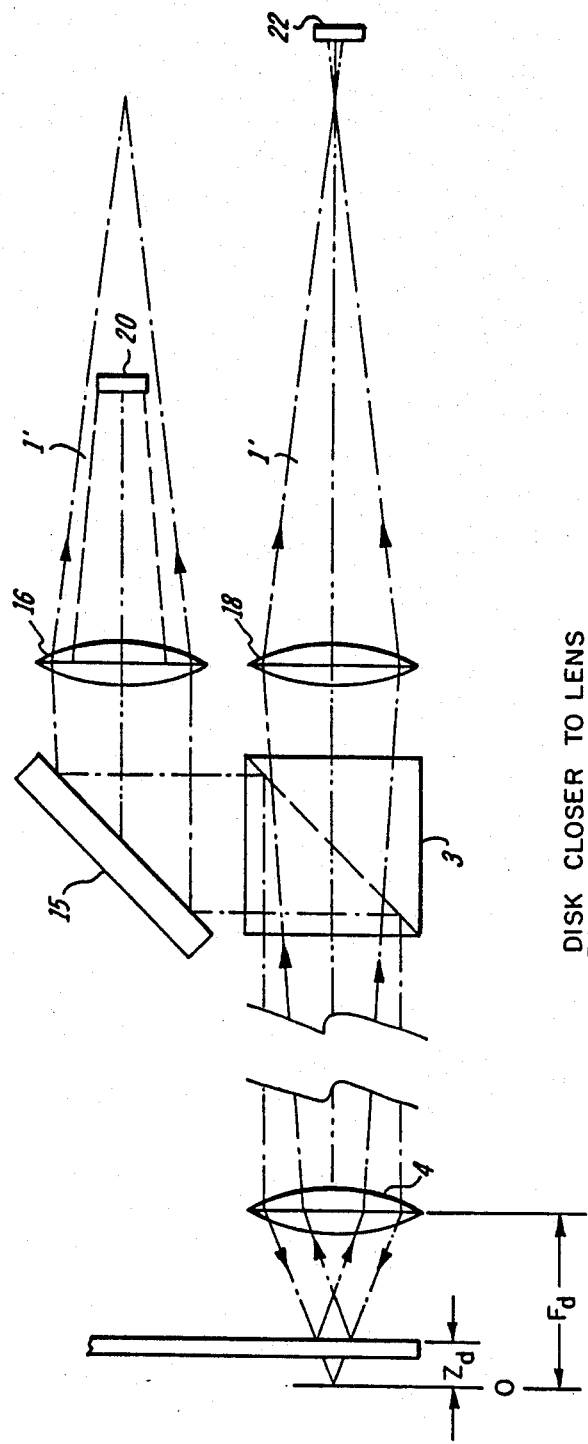

The operational principle of the novel data detection/push-pull focus error detection system is described with reference to the three drawings of FIG. 3. The drawings depict the position of the return focus spots in the two differential detection channels of a magneto-optic optical head for three positions of the magneto-optic medium 7 relative to the objective lens 4. Drawing 3(a) shows the medium 7 at the true focus $F_d$ of the objective lens 4, with the return or reflected beams 1' focused by lenses 16 and 18 at the focal plane $F_o$. Drawings 3(b) and 3(c) show how the focus spots move to either side of the desired focus position (plane $F_o$) when the medium 7 moves a distance $Z_d$ away and towards the objective lens, respectively. All three drawings of FIG. 3 show the detectors 20 and 22 placed correctly to generate the focus error curve. The distance $Z'$, that is the distance that each detector 20 and 22 is displaced from the focal plane $F_o$, is a function of the radius $R_d$ of the detector elements, the focal length $F_o$ of the lenses 16 and 18 and the required linear range $Z_1$ of the focus error curve, as discussed in more detail hereinafter. As the disk 6 moves away from the objective lens 4 the focus spots move towards the detector lenses 16 and 18, as shown by FIG. 3(b). The detector closer to the detector lens (detector 20) begins to receive more light because the light incident on it is more concentrated and the detector placed further away from the detector lens (detector 22) receives less light because it is within an expanding cone of light. In contrast, when the disk 6 moves toward the objective lens 4, the focus spots move away from the detector lenses 16 and 18, as shown in FIG. 3(c). The detector closer to the detector lenses (detector 20) begins to receive less light because the light incident on it is in an expanding cone of light and the detector further away from the detector lenses (detector 22) begins to receive more light because the light incident on it is more concentrated. The difference of the amplified signals of detectors 20 and 22 is reproduced at the output of differential amplifier 24. The output of the differential detector 24, having a sign indicative of the focus error at the medium 7, is supplied to the low pass filter 36 which extracts the dc level of the focus error correction signal.

A typical focus error signal curve "A" along with a curve "B" representing the sum of the light power intercepted by the detectors 20 and 22 are illustrated in FIG. 4. The focus error signal is zero when correct focus is achieved because both detectors 20 and 22 receive the same amount of light. However, when the disk 6 moves away from the objective lens 4, the output signal goes positive on the curve since detector 20 now receives more light than detector 22. In contrast, when the disk 6 moves toward the objective lens 4, the output signal goes negative because the detector 22 now receives more light than detector 20. There is a disk position on each side of true focus where the entire beam is focused on one detector or the other. At this point, the output signal stops being more positive or negative as the case may be and proceeds to approach the zero value as the focus point moves further towards or away from the detectors. The region between the positive and negative peaks where the focus error signal curve is nearly linear with disk focus error is optimal for servo control of the objective lens 4.

Two of the main objectives achieved by the disclosed focus error detection arrangement are maximization of the slope and linear range of the focus error signal curve A while maintaining the sum signal curve B as large and flat as possible. Also, since the focus error detection arrangement utilizes all of the components used for data detection, focus detection is achieved without a large number of additional optical and electrical elements.

Since the focus error signal is derived from the same differential detection channel as the magneto-optic data, the push-pull focus technique disclosed requires sampling of the error signal at only specific (non-data) portions of the track(s) of the optical disk. The concept and circuitry for providing focus detection only from non-data portions of the track(s) of an optical disc is conventional. The reason for sampling the focus error at non-data portions of the track(s) of the disc 6 is that if data bits were also represented by the focus signal, the focus error signal curve would have a floating offset determined by the mean value of the data signal generated by detectors 20 and 22, noting that in ablative or deformable storage the values of the signals at detectors 20 and 22 would vary in amplitude in accordance with changes in light reflection from the ablated or deformed portions of the medium 7 and that in magneto-optic storage the amplitude of the signal generated at the respective detectors 20 and 22 would vary with changes in the direction of the magnetization of the medium 7. Thus, in order for the push-pull focus technique to properly function, specific non-data regions along data track(s) of the disk must be set aside for focus control. Also, by providing focus control from only non-data portions of the track(s) of the disk 6, the high intensity light of the write beam will not interfere with focus detection and control by a servo system this is highly light sensitive.

A simple analytical technique will be used to study of system parameters that affect the focus error signal curve and an example will be worked out that will give the slope and linear range of the focus error signal curve for specific simple, positive lenses 16 and 18 and circular detectors 20 and 22.

Since the shape of the intensity profile of the light beam 1 can be considered Gaussian for all practical purposes, the focus error curve generated by the push-pull technique can be readily derived as a function of the integral of a Gaussian function since the detectors 20 and 22 integrate the beam over the detector area. The intensity of a Gaussian beam is defined as $$I(r) = (2P_T/\pi w^2) \exp^{-2(r/w)^2} \quad (1)$$

where r is the beam radius a distance perpendicular to the optical axis, w is the defining waist radius of the beam, and $P_T$ is the total power in the beam. When r is made equal to w the intensity becomes $$I(w) = (2P_T/\pi w^2) \exp^{-2} \quad (2)$$

or $$I(w) = (0.13) * I(O) \quad (3)$$

that is, the intensity is down to 13% of its value at r=0. For purposes of this analysis, the waist radius at a specific point along the optical axis is related to the waist radius at focus $w_o$ by the simple relationship $$w(Z) = \lambda Z / \pi w_o \quad (4)$$

where $\lambda$ is is the wavelength of the light beam 1 and X is the distance to optimem (perfect) focus. This waist w(Z) is the w used in Equation (1). Therefore, if the output spot waist radius is defined as $w_o$ at correct focus, the intensity at the detectors displaced Z' from w can be written as $$I(Z') = (2P_T/\pi w^2) \exp^{-2(r/[\lambda Z'/\pi w_o])^2} \quad (5)$$

When the disk moves an amount $Z_d$, the output spot moves approximately as given by the following relationship:

$$Z_o = 2(F_o/F_d)^2 * Z_d \quad (6)$$

where $F_o$ and $F_d$ are the focal lengths of the detector output lenses and objective lens at the disk, respectively. The locations of the new output focal point is $Z'+Z_o$ for the first detector and $Z'-Z_o$ for the second detector. Now the intensities at the two detectors become $$I(Z'+Z) = k * \exp^{-2(r/a[1+Z_o/Z'])^2} \quad (7)$$

and $$I(Z'-Z) = k * \exp^{-2(r/a[1-Z_o/Z'])^2} \quad (8)$$

where $\alpha = (Z'/w_o)$

Integrating Equations (7) and (8) over the detector areas gives the following normalized results for the focus error signal and the sum signal:

$$E(Z_o) = \exp - \gamma^2(1/[1+Z_o/Z'])^2 - \exp - \gamma^2(1/[1-Z_o/Z'])^2 \quad (9)$$

$$S(Z_o) = \quad (10)$$

-continued $$2 - \exp - \gamma^2(1/[1+Z_o/Z'])^2 - \exp - \gamma^2(1/[1-Z_o/Z'])^2$$

for $$R_d = r \text{ and } \gamma = [R_d/(\lambda Z'/\pi w_o)]\sqrt{2} \quad (11)$$

or $$R_d = \gamma w(Z') = \gamma(\lambda Z'/\pi w_o)/\sqrt{2} \quad (12)$$

Figure 5:
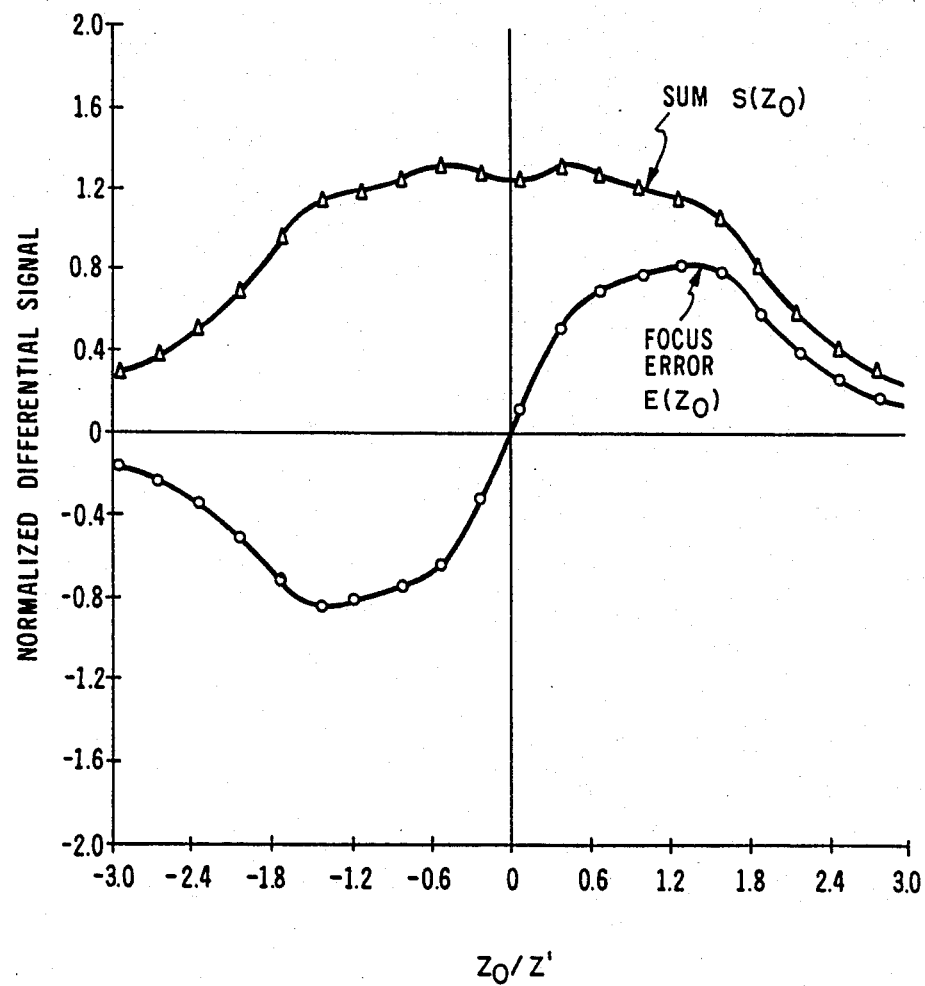

Equations (9) and (10) are plotted in FIG. 5 for $\gamma = 1/\sqrt{2}$ giving $R_d = 0.707 W(Z')$. The abscissa coordinate is $Z_o/Z'$; a normalized quantity representing the motion of the output spot with respect to the detector separation. The focus error curve is the "S"-shaped curve crossing the zero axis. The upper curve is the sum signal curve. The focus error curve has a steep slope around $Z_o = 0$ and a linear range of approximately $Z_o = 0.6 * Z'$. The sum signal $S(Z_o)$ has a large value near 0.7 and remains relatively flat over the linear range of the error curve. Thus, both of these curves exhibit the desired characteristics mentioned previously.

The sensitivity of the error curve at $Z_o = 0$ is of particular interest because it is related directly to the accuracy to which the objective lens can follow the disk as it moves past the lens. The sensitivity is derived from the error curve by differentiating it with respect to the motion of the output focus spot, that is, $$dE/dZ_o|_{Z_o=0} = (8\gamma^2 \exp^{-2\gamma^2})/Z' \quad (13)$$

Figure 6:
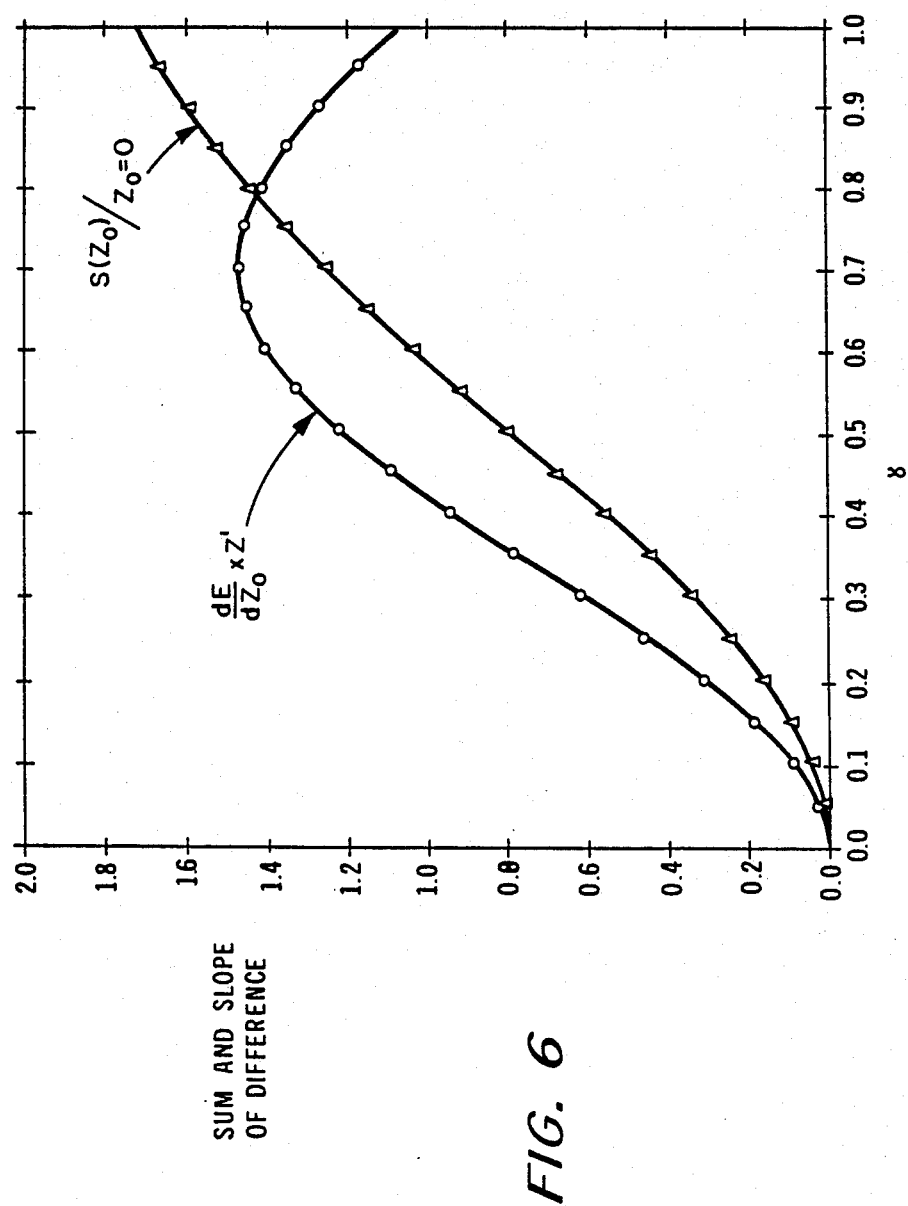
FIG. 6 shows curves of focus error sensitivity and total beam power.

FIG. 6 contains a plot of $dE/dZ_o*(Z')$ as a function of $\gamma$ and a second curve that represents the total beam power collected by the detectors. An interesting point that is related by these plots is that the slope hits a maximum when the detector radius is equal to $1/\sqrt{2}$ of the waist radius. However, at this radius the two detectors are only collecting about 64% of the total light available. If the detector diameter were made slightly larger, say $0.9*w(Z')$ instead of $0.707*w(Z')$, then the detectors would be collecting about 80% of the light, an increase of 25%, whereas the sensitivity would only drop by 12%. This shows that a tradeoff can be made to increase the amount of light collected if the system sensitivity is relatively high.

The sensitivity that is of most interest is that relative to the disk displacement $Z_d$. This is derived as $$dE/dZ_d|_{Z_o=0} = dE/dZ_o|_{Z_o=0} * dZ_o/dZ_d \quad (14)$$

Now from Equation (6)

$$dZ_o/dZ_d = 2(F_o/F_d)^2 \quad (15)$$

and from Equation (12)

$$Z' = R_d \pi w_o/(\gamma\lambda) \quad (16)$$

and $$Z' = R_d F_o/(R_L \gamma) \quad (17)$$

where $R_L$ is the radius of the objective lens entrance pupil. Substituting Equations (15) and (17) into (14) one obtains $$dE/dZ_d|_{Z_d=0} = (8\gamma^2 \exp^{-2\gamma^2})\cdot 2(F_o/F_d)^2/[R_d F_o/R_L \gamma] \quad (18)$$

An exemplary data detection/error detection arrangement could utilize simple, positive detector lenses 16 and 18 with $R_d$ (radius of detectors)=0.25 mm and $F_o$ (focal length of detector output lenses)=100 mm and a simple, positive objective lens 4 with $R_L$ (radius of objective lens entrance pupil)=2.15 mm and $F_d$ (focal length of objective lens)=4.58 mm, and have $\gamma=0.9$. Substituting these values into Equation (18) one obtains $$dE/dF_d|_{Z_d=0} = 0.10/\text{micron} \quad (19)$$

with $$Z' = 12.9 \text{ mm} \quad (20)$$

The linear range is given approximately by $$Z_c = 0.60 \cdot Z' \quad (21)$$

from plots of the focus error curve for various values of $\gamma$. Now by using Equation (6) the linear range relative to the disk focal error is obtained as $$Z_d = 0.60 \cdot Z'/[2(F_o/F_d)^2] \quad (22)$$

$$Z_d = \pm 7.7 \text{ microns} \quad (23)$$

Figure 7:
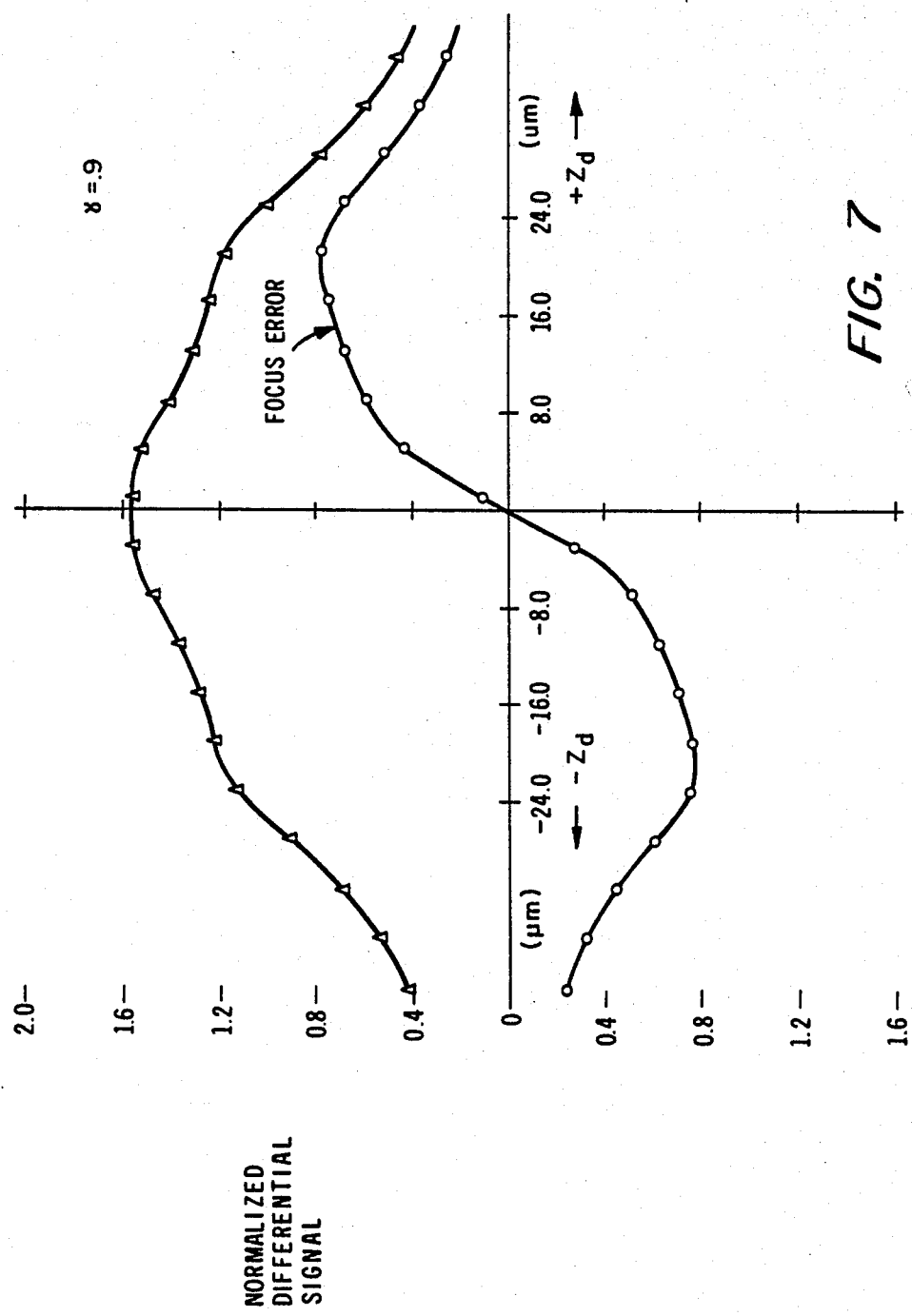

The resulting relationships and calculations shows that one can achieve very good sensitivity, 0.10/micron, and reasonable linear range, +7.7 microns, with an optical efficiency of 80% from the push-pull focus technique without sacrificing space. (The calculated focus error and sum curves are shown in FIG. 7 for this example).

Although the selected focal length of the detector lenses was specified as 100 mm, by using a negative and positive element combination lens for the detector lenses, such as, a positive lens with +23 mm focal length, followed by a negative lens with −4.6 mm focal length, the length of the optical package can be kept nearly as small as one using only 25 mm focal length positive lenses.

We claim:

1. A focus error detection system for an optical disc system including
   means for guiding light from an optical disc to a pair of detector lenses,
   a first photodetector associated with one of said detector lenses and a second photodetector associated with the other of said detector lenses, and
   a differential amplifier connected to receive the outputs of said first and second photodetectors, the improvement comprising
   locating said first photodetector forward of the focus of its associated detector lens by a distance Z′ and locating said second photodetector beyond the focus of its associated detector lens by the distance Z′, and
   a low pass filter coupled to the output of said differential amplifier to provide a focus error signal at the output thereof.

* * * * *